US012317029B2

(12) United States Patent
Backman et al.

(10) Patent No.: US 12,317,029 B2
(45) Date of Patent: May 27, 2025

(54) LOUDSPEAKER AND ELECTRONIC DEVICE

(71) Applicant: AAC Microtech (Changzhou) Co., Ltd., Changzhou (CN)

(72) Inventors: Juha Backman, Tampere (FI); Timo Lamberg, Tampere (FI)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 253 days.

(21) Appl. No.: 17/881,636

(22) Filed: Aug. 5, 2022

(65) Prior Publication Data

US 2024/0048894 A1 Feb. 8, 2024

(51) Int. Cl.
*H04R 1/28* (2006.01)
*H04R 1/34* (2006.01)

(52) U.S. Cl.
CPC .......... *H04R 1/2811* (2013.01); *H04R 1/345* (2013.01); *H04R 2499/11* (2013.01)

(58) Field of Classification Search
CPC .... H04R 1/2811; H04R 1/345; H04R 2499/11
USPC .......................................................... 181/156
See application file for complete search history.

(56) References Cited

U.S. PATENT DOCUMENTS 10,142,726 B2 * 11/2018 Oishi ..................... H04R 1/403
11,490,191 B1 * 11/2022 Backman ............... H04R 1/025
11,516,564 B2 * 11/2022 Lin ......................... H04R 1/02
11,827,156 B2 * 11/2023 Shao ..................... H04R 1/2869
12,096,179 B2 * 9/2024 Liu ...................... H04R 1/2834
2016/0119718 A1 * 4/2016 Yang ........................ H04R 1/24 381/351
2022/0201376 A1 * 6/2022 Lamberg ................ H04R 1/021

* cited by examiner

*Primary Examiner* — Forrest M Phillips
(74) *Attorney, Agent, or Firm* — Wiersch Law Group

(57) ABSTRACT

Provided is a loudspeaker applied to an electronic device, including: a speaker body configured for vibrating and producing sound; a first acoustic channel having a first end communicated with the speaker body and a second end forming a first sound output port on a case of the electronic device; and a second acoustic channel having a first end communicated with the speaker body and a second end forming a second sound output port on the case of the electronic device. The first and second sound output ports are located on adjacent wall surfaces of the case of the electronic device. Compared with the related art, larger port area can be achieved by separately forming sound output ports on adjacent walls of the housing, resulting in high frequency response and higher gain. The horn-shaped sound output port facilitates design and reduces flow-related distortion and noise at low frequencies.

5 Claims, 5 Drawing Sheets

LOUDSPEAKER AND ELECTRONIC DEVICE

TECHNICAL FIELD

The present disclosure relates to the technical field of electro-acoustic conversion and, in particular, to a loudspeaker and an electronic device.

BACKGROUND

Conventional loudspeakers in the related art can be divided into three main groups: telephones and other portable devices with two or more sound ports, horn loudspeakers using a single driver (speaker body) with multiple horns, and loudspeakers with an opening extending around an enclosure.

Port arrangement of a conventional speaker has an acoustic outlet opening at one side of the electronics enclosure. The acoustic outlet can have the shape of a horn, and the horn can also be bent or folded, or have two outlets connected to both ends of the front cavity of the rectangular speaker body.

The drivers of loudspeakers used in electronic device are quite capable devices, typically producing high quality acoustical output up to and even above 20 kHz when used in free air. The basic current approach of designing electronic devices is to limit the sound output port of the loudspeaker on one side of the electronic device, usually the at the terminal end. This approach may lead to several problems:

- At low frequencies, the flow velocity within the sound output port is high, causing unnecessary noise and distortion;
- At high frequencies, it is impossible to design a straight port with a sufficiently high port-cavity resonant frequency unless the driver is very close to the device edge;
- New drivers with larger displacements than the earlier generations of telecommunications loudspeakers need higher front cavities, which again necessitate the use of larger output port area so that the port-cavity resonance does not limit high frequency output too much;
- When port dimensions are small the gain and the control of high frequency port resonances that can be achieved using horn loading is limited.

In addition, the use of multiple speakers in equipment for stereo and multi-channel reproduction is becoming more common, and when the equipment is held vertically ("portrait mode"), the distance between the speakers at one end becomes very small, limiting the stereo quality.

SUMMARY

The purpose of the present disclosure is to provide a loudspeaker and an electronic device to solve the technical problems in the related art, which can achieve good acoustic gain and flat frequency response.

The present disclosure provides a loudspeaker applied to an electronic device, including: a speaker body configured for vibrating and producing sound; a first acoustic channel having a first end communicated with the speaker body and a second end forming a first sound output port on a case of the electronic device; and a second acoustic channel having a first end communicated with the speaker body and a second end forming a second sound output port on the case of the electronic device. The first sound output port and the second sound output port are located on adjacent wall surfaces of the case of the electronic device.

As an improvement, an inner diameter of the first sound output port is different from an inner diameter of the second sound output port.

As an improvement, the first acoustic channel includes a plurality of independently arranged first acoustic sub-channels, ends of the plurality of first acoustic sub-channels away from the speaker body form a plurality of first sound output sub-ports on the housing of the electronic device, and the first sound output port consists of the plurality of first sound output sub-ports; the second acoustic channel includes a plurality of independently arranged second acoustic sub-channels, ends of the plurality of second acoustic sub-channels away from the speaker body form a plurality of second sound output sub-ports on the housing of the electronic device, and the second sound output port consists of the plurality of the second sound output sub-ports.

As an improvement, the plurality of the first acoustic sub-channels are arranged in parallel and the plurality of the second acoustic sub-channels are arranged in parallel.

As an improvement, the first acoustic channel and the second acoustic channel are connected to adjacent wall surfaces of the speaker body.

As an improvement, the first acoustic channel and the second acoustic channel are connected to a same wall surface of the speaker body.

As an improvement, the first acoustic channel and the second acoustic channel are connected to opposite wall surfaces of the speaker body.

As an improvement, the first acoustic channel and the second acoustic channel are both provided with a sound absorbing material.

As an improvement, the first end of the first acoustic channel and the first end of the second acoustic channel both protrude from a top surface of the speaker body.

As an improvement, the first end of the first acoustic channel is partially communicated with the first end of the second acoustic channel.

As an improvement, a wall surface with which the first acoustic channel of the speaker body is connected is parallel to a wall surface on which the first sound output port of the electronic device is located, and a wall surface with which the second acoustic channel of the speaker body is connected is parallel to a wall surface on which the second sound output port of the electronic device is located.

As an improvement, a wall surface with which the first acoustic channel of the speaker body is connected is oblique with respect to a wall surface on which the first sound output port of the electronic device is located, and a wall surface with which the second acoustic channel of the speaker body is connected is oblique with respect to a wall surface on which the second sound output port of the electronic device is located.

As an improvement, the speaker body has a cylindrical structure.

The present disclosure also provides an electronic device including a case and the loudspeaker as described above installed in the case.

Compared with the related art, the present disclosure allows a significantly larger port area than the related art by separately forming sound output ports on the adjacent walls of the housing of the electronic device, resulting in extended high frequency response and higher gain. The horn-shaped sound output port facilitates design and reduces flow-related distortion and noise at low frequencies. The use of multiple ports gives the designer more freedom to achieve good acoustic gain and flat frequency response. With proper design of the wavefront shape (achieved by the shape of the channel), the acoustic center of the system can be placed near the corners of the electronics, and in some cases the virtual acoustic center may even be outside the physical width of the system, which provides a significant advantage in providing a wider stereo image.

REFERENCE SIGNS

Figure 1:
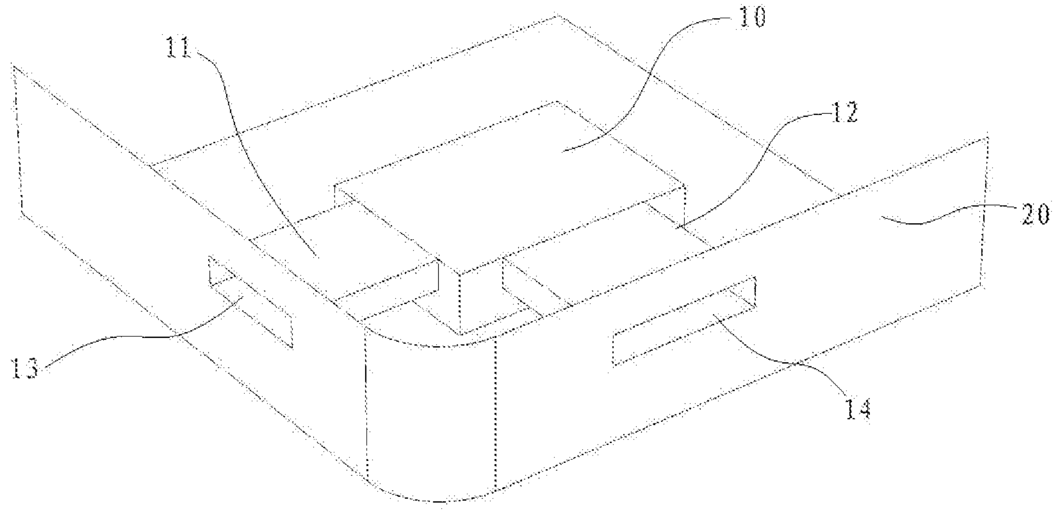
FIG. 1 is an axonometric view of a first structure of a loudspeaker according to an embodiment of the present disclosure.

10—speaker body, 11—first acoustic channel, 111—first acoustic sub-channel, 12—second acoustic channel, 121—second acoustic sub-channel, 13—first sound output port, 131—first sound output sub-port, 14—second sound output port, 141—second sound output sub-port;

20—Electronic device.

DESCRIPTION OF EMBODIMENTS

Embodiments described below with reference to the accompanying drawings are exemplary and are only used to explain the present disclosure, but not to be construed as limitations to the present disclosure.

As shown in FIG. 1 to FIG. 9, an embodiment of the present disclosure provides a speaker installed in an electronic device 20. The speaker includes a speaker body 10, a first acoustic channel 11 and a second acoustic channel 12.

The speaker body 10 has a cavity inside for accommodating the driver, and the driver divides the cavity of the speaker body 10 as a front acoustic cavity and a closed rear acoustic cavity, for vibrating and producing sound. In an embodiment, the driver may include structures such as a diaphragm, a voice coil, and a magnetic circuit unit. Under action of the magnetic circuit unit, the voice coil with a changing current is vibrated by the ampere force of different magnitudes. The vibration of the voice coil drives the diaphragm to vibrate, and the vibration of the diaphragm pushes the surrounding air to vibrate, thereby producing sound.

A first end of the first acoustic channel 11 is communicated with the speaker body and a second end of the first acoustic channel 11 forms a first sound output port 13 on the case of the electronic device 20.

A first end of the second acoustic channel 12 is communicated with the speaker body 10, and a second end of the second acoustic channel 12 forms a second sound output port 14 on the case of the electronic device 20.

The first sound output port 13 and the second sound output port 14 are located on adjacent wall surfaces of the case of the electronic device 20.

In an embodiment, the first sound output port 13 and the second sound output port 14 are both flat bar-shaped holes. The first acoustic channel 11 and the second acoustic channel 12 communicate with the outside of the speaker body 10 through the first sound output port 13 and the second sound output port 14, respectively, so as to transmit the sound emitted by the vibration of the speaker body 10. Those skilled in the art can understand that the shape and size of the first sound output port 13 and the second sound output port 14 can be determined according to the actual situation.

The above-described embodiment allows a significantly larger port area than existing designs by respectively forming sound output ports on adjacent walls of the housing of the electronic device 20, resulting in an extended high frequency response and facilitating design of sound port having a horn-shaped sound output with greater gain, and reducing flow-related distortion and noise at low frequencies. The use of multiple ports gives the designer more freedom to achieve good acoustic gain and flat frequency response. With proper design of the wavefront shape (achieved by the shape of the channel), the acoustic center of the system can be placed near the corners of the electronic device 20. In some cases, the virtual acoustic center may even be outside the physical width of the system, which provides a significant advantage in providing a wider stereo image.

In an embodiment of the present disclosure, the inner diameter of the first sound output port 13 is different from the inner diameter of the second sound output port 14, so that the sound output signal combined has a more flat frequency response or better controlled polarity characteristics than, for example, a single port or two or more identical ports.

In an embodiment of the present disclosure, as shown in FIG. 3, FIG. 5, FIG. 7 and FIG. 9, the first acoustic channel 11 includes a plurality of independently arranged first acoustic sub-channels 111. One end of the speaker body 10 is formed on the housing of the electronic device 20 to form a first sound output sub-port 131. The first sound output port 13 consists of several first sound output sub-ports 131. Optionally, the first acoustic channel 11 includes two independent sound output ports 131. The provided first acoustic sub-channel 111, the two first acoustic sub-channels 111 are arranged in parallel and are arranged on the same side wall surface of the housing of the electronic device 20. The first sound output port 13 consists of two adjacent and parallel first acoustic sub-channels 111.

The cross-sectional areas of the pair of first acoustic sub-channels 111 located in the same plane are identical, so that the two channels are acoustically symmetrical to each other, thus avoiding quarter-wave resonance due to the use of an acoustically asymmetric structure, which resonance may cause the wave to tilt and reduce the high-frequency output.

The second acoustic channel 12 includes a plurality of independently arranged second acoustic sub-channels 121, and the ends of the plurality of second acoustic sub-channels 121 away from the speaker body 10 form second sound output sub-ports on the housing of the electronic device 20. The output port 14 consists of a plurality of second sound output sub-ports. Optionally, the second acoustic channel 12 includes two independently arranged second acoustic sub-channels 121, and the two second acoustic sub-channels 121 are arranged in parallel on the same side wall surface of the housing of the electronic device 20. The second sound output port 14 consists of two second acoustic sub-channels 121 that are close to each other and are parallel.

The cross-sectional areas of a pair of second acoustic sub-channels 121 located in the same plane are identical, so that the two channels are acoustically symmetrical to each other, thus avoiding quarter-wave resonance due to the use of an acoustically asymmetric structure, which resonance may cause the wave to tilt and reduce the high-frequency output.

In an embodiment, the first sound output port 13 and the second sound output port 14 may be located at the same height in the direction of gravity, or may have a height difference, which is not limited herein.

In an embodiment of the present disclosure, the first acoustic channel 11 and the second acoustic channel 12 may be straight, or bent/folded. Optionally, the area of the first acoustic channel 11 and the area of the second acoustic channel 12 gradually increase in the direction from the speaker body 10 to the corresponding sound output ports, which can increase the highest frequency of the sound wave generated by the speaker, and make the high frequency resonance of the sound wave less sharp.

In an embodiment, both the first acoustic channel 11 and the second acoustic channel 12 are provided with sound absorbing materials. The sound absorbing material is preferably a porous structure, such as loose and porous fibers, foam particles, zeolite, activated carbon and other materials. When the speaker body 10 vibrates, the sound-absorbing material participates in tuning, to produce desired acoustic effect.

In an embodiment of the present disclosure, the driver includes but is not limited to dynamic, piezoelectric, micro-electromechanical system (MEMS) or electromagnetic driver.

FIG. 1 is an axonometric view of a first structure of a loudspeaker according to an embodiment of the present disclosure. Referring to FIG. 1, the wall surface with which the first acoustic channel 11 of the speaker body 10 is connected is parallel to the wall surface on which the first sound output port 13 of the electronic device 20 is located, and the wall surface with which the second acoustic channel 12 of the speaker body 10 is connected is parallel to the wall surface on which the second sound output port 14 of the electronic device 20 is located. The first acoustic channel 11 and the second acoustic channel 12 are connected to the adjacent wall surfaces of the speaker body 10. Both the first acoustic channel 11 and the second acoustic channel 12 have straight structures.

Figure 2:
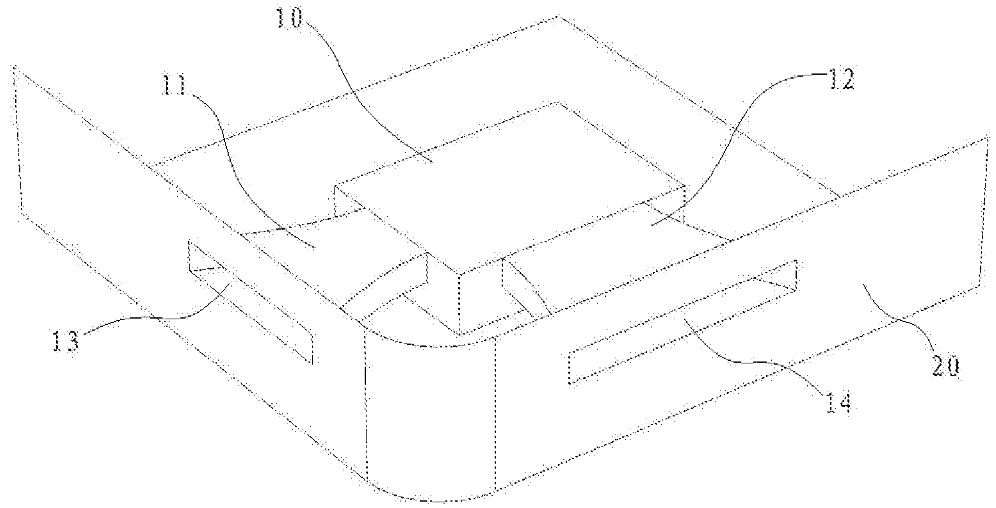
FIG. 2 is an axonometric view of a second structure of a loudspeaker according to an embodiment of the present disclosure.

FIG. 2 is an axonometric view of a second structure of a loudspeaker according to an embodiment of the present disclosure. Referring to FIG. 2, the wall surface with which the first acoustic channel 11 of the speaker body 10 is connected is parallel to the wall surface on which the first sound output port 13 of the electronic device 20 is located, and the wall surface with which the second acoustic channel 12 of the speaker body 10 is connected is parallel to the wall surface on which the second sound output port 14 of the electronic device 20 is located. The first acoustic channel 11 and the second acoustic channel 12 are connected to the adjacent wall surfaces of the speaker body 10. Both the first acoustic channel 11 and the second acoustic channel 12 have horn-shaped structures.

Figure 3:
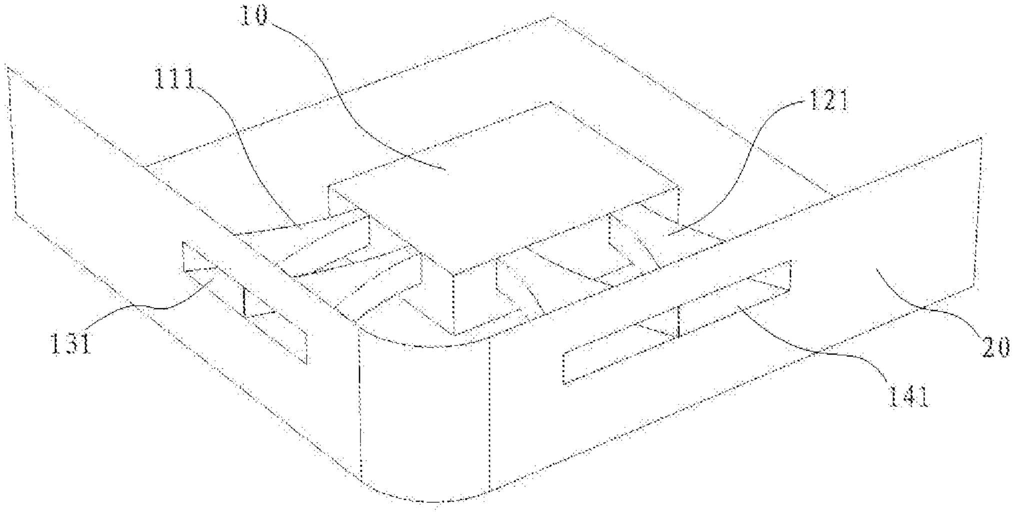
FIG. 3 is an axonometric view of a third structure of a loudspeaker according to an embodiment of the present disclosure.

FIG. 3 is an axonometric view of a third structure of a loudspeaker according to an embodiment of the present disclosure. Referring to FIG. 3, the wall surface with which the first acoustic channel 11 of the speaker body 10 is connected is parallel to the wall surface on which the first sound output port 13 of the electronic device 20 is located, and the wall surface with which the second acoustic channel 12 of the speaker body 10 is connected is parallel to the wall surface on which the second sound output port 14 of the electronic device 20 is located. The first acoustic channel 11 and the second acoustic channel 12 are connected to the adjacent wall surfaces of the speaker body 10. Both the first acoustic channel 11 and the second acoustic channel 12 have horn-shaped structures. The first acoustic channel 11 includes two independently arranged first acoustic sub-channels 111, and the second acoustic channel 12 includes two independently arranged second acoustic sub-channels 121.

Figure 4:
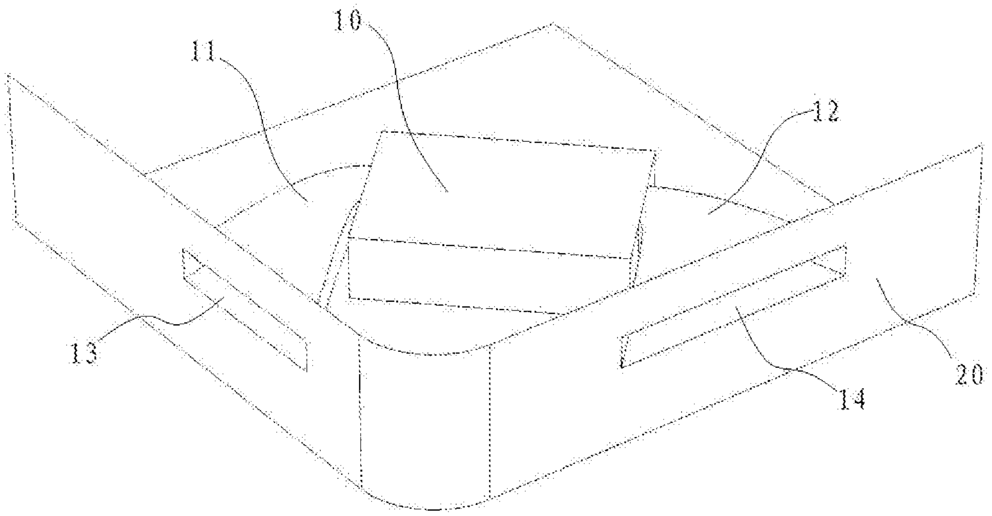
FIG. 4 is an axonometric view of a fourth structure of a loudspeaker according to an embodiment of the present disclosure.

FIG. 4 is an axonometric view of a fourth structure of a loudspeaker according to an embodiment of the present disclosure. Referring to FIG. 4, the wall surface with which the first acoustic channel 11 of the speaker body 10 is connected is oblique compared to the wall surface on which the first sound output port 13 of the electronic device 20 is located, and the wall surface with which the second acoustic channel 12 of the speaker body 10 is connected is parallel to the wall surface on which the second sound output port 14 of the electronic device 20 is located. The first acoustic channel 11 and the second acoustic channel 12 are connected to the opposite wall surfaces of the speaker body 10. Both the first acoustic channel 11 and the second acoustic channel 12 have horn-shaped structures. The horn-shaped structures rotate at a certain angle.

Figure 5:
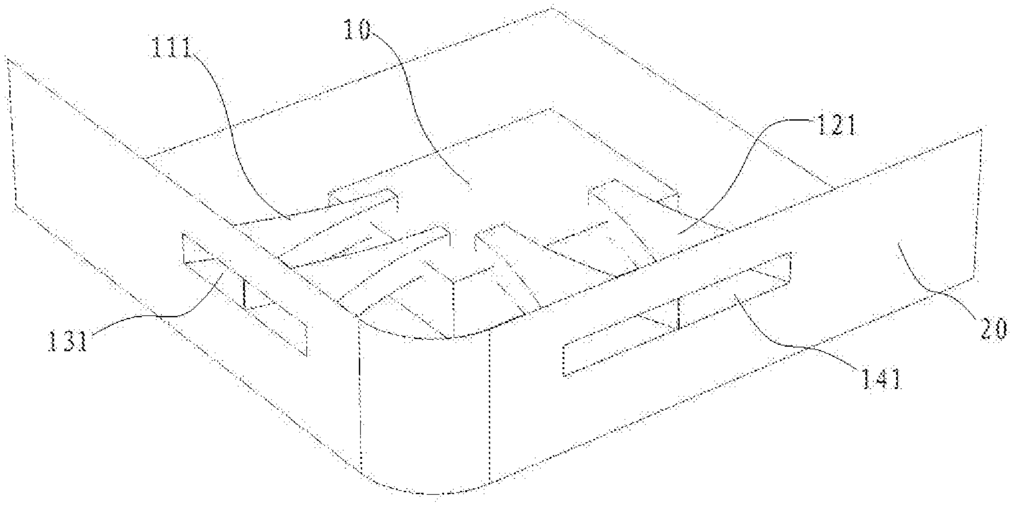
FIG. 5 is an axonometric view of a fifth structure of a loudspeaker according to an embodiment of the present disclosure.

FIG. 5 is an axonometric view of a fifth structure of a loudspeaker according to an embodiment of the present disclosure. Referring to FIG. 5, the wall surface with which the first acoustic channel 11 of the speaker body 10 is connected is parallel to the wall surface on which the first sound output port 13 of the electronic device 20 is located, and the wall surface with which the second acoustic channel 12 of the speaker body 10 is connected is parallel to the wall surface on which the second sound output port 14 of the electronic device 20 is located. The first acoustic channel 11 and the second acoustic channel 12 are connected to the adjacent wall surfaces of the speaker body 10. Both the first acoustic channel 11 and the second acoustic channel 12 have horn-shaped structures. The first acoustic channel 11 includes two independently arranged first acoustic sub-channels 111, and the second acoustic channel 12 includes two independently arranged second acoustic sub-channels 121. The first acoustic channel 11 and the second acoustic channel 12 extend for a certain distance on the top surface of the speaker body.

Figure 6:
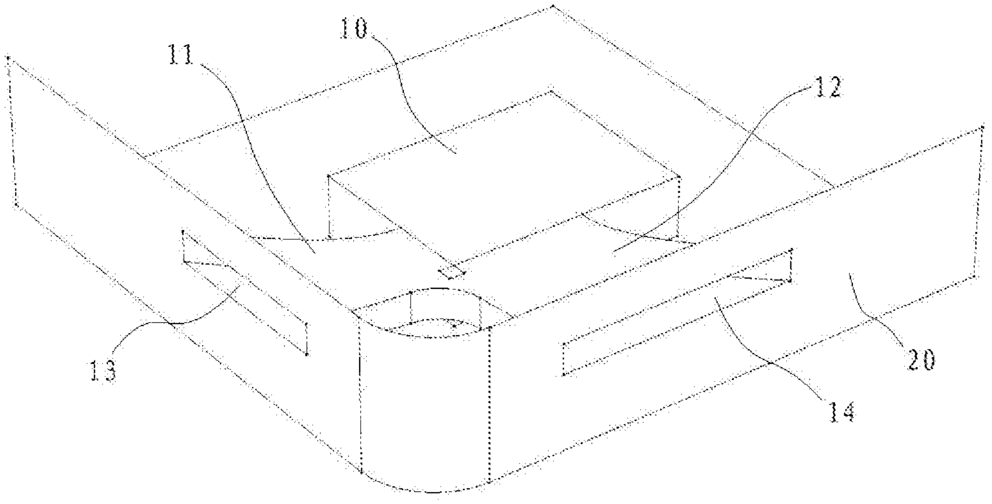
FIG. 6 is an axonometric view of a sixth structure of a loudspeaker according to an embodiment of the present disclosure.

FIG. 6 is an axonometric view of a sixth structure of a loudspeaker according to an embodiment of the present disclosure. Referring to FIG. 6, the wall surface with which the first acoustic channel 11 of the speaker body 10 is connected is parallel to the wall surface on which the first sound output port 13 of the electronic device 20 is located, and the wall surface with which the second acoustic channel 12 of the speaker body 10 is connected is parallel to the wall surface on which the second sound output port 14 of the electronic device 20 is located. The first acoustic channel 11 and the second acoustic channel 12 are connected to the adjacent wall surfaces of the speaker body 10. Both the first acoustic channel 11 and the second acoustic channel 12 have horn-shaped structures. The first acoustic channel 11 and the second acoustic channel 12 are connected to each other near the starting point.

Figure 7:
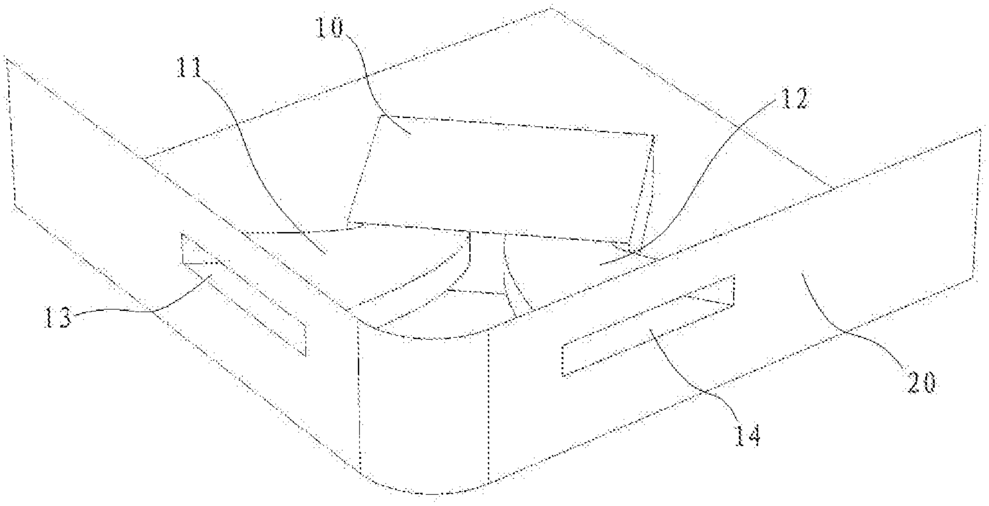
FIG. 7 is an axonometric view of a seventh structure of a loudspeaker according to an embodiment of the present disclosure.

FIG. 7 is an axonometric view of a seventh structure of a loudspeaker according to an embodiment of the present disclosure. Referring to FIG. 7, the wall surface with which the first acoustic channel 11 of the speaker body 10 is connected is oblique compared to the wall surface on which the first sound output port 13 of the electronic device 20 is located, and the wall surface with which the second acoustic channel 12 of the speaker body 10 is connected is parallel to the wall surface on which the second sound output port 14 of the electronic device 20 is located. The first acoustic channel 11 and the second acoustic channel 12 are connected to the same wall surface of the speaker body 10. Both the first acoustic channel 11 and the second acoustic channel 12 have horn-shaped structures.

Figure 8:
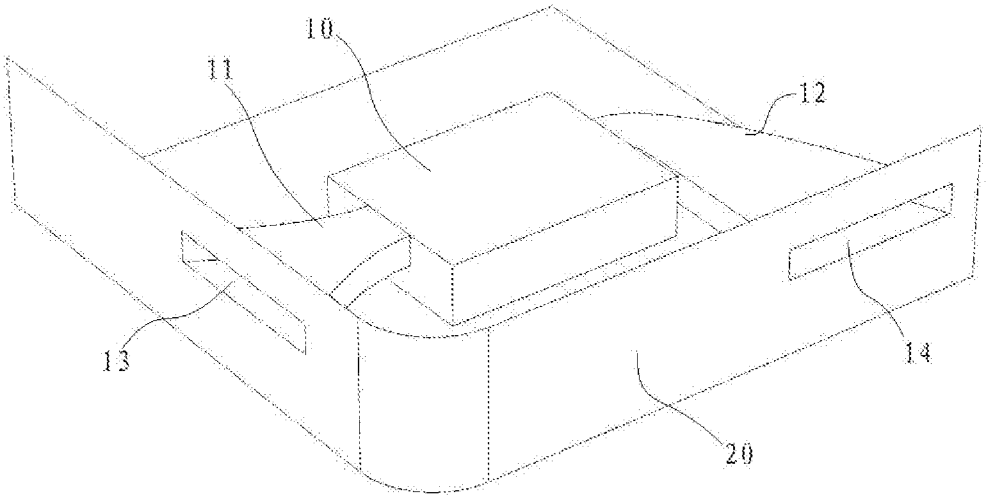
FIG. 8 is an axonometric view of an eighth structure of a loudspeaker according to an embodiment of the present disclosure.

FIG. 8 is an axonometric view of an eighth structure of a loudspeaker according to an embodiment of the present disclosure. Referring to FIG. 8, the wall surface with which the first acoustic channel 11 of the speaker body 10 is connected is parallel to the wall surface on which the first sound output port 13 of the electronic device 20 is located, and the wall surface with which the second acoustic channel 12 of the speaker body 10 is connected is parallel to the wall surface on which the second sound output port 14 of the electronic device 20 is located. The first acoustic channel 11 and the second acoustic channel 12 are connected to the opposite wall surfaces of the speaker body 10. Both the first acoustic channel 11 and the second acoustic channel 12 have horn-shaped structures. The first sound output port 13 and the second sound output port 14 have a height difference in the direction of gravity.

Figure 9:
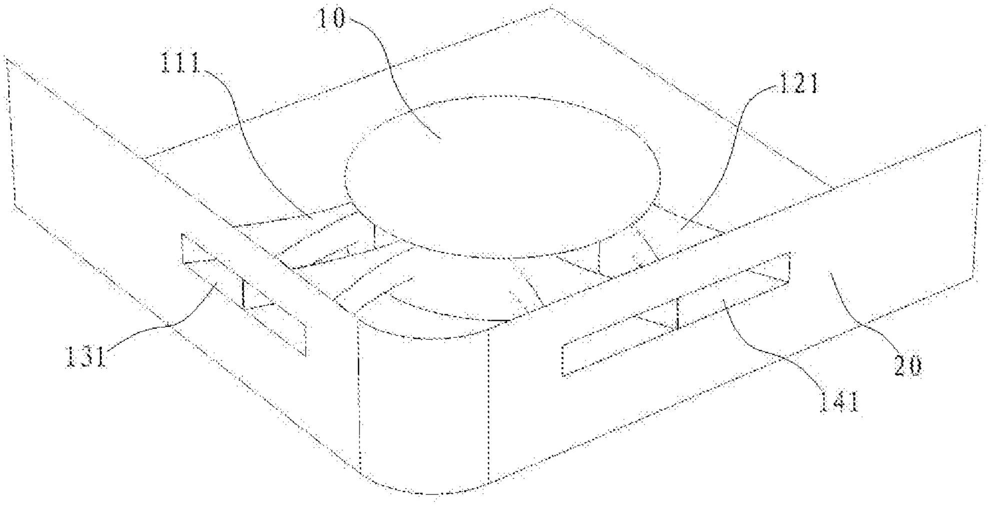
FIG. 9 is an axonometric view of a ninth structure of a loudspeaker according to an embodiment of the present disclosure.

FIG. 9 is an axonometric view of a ninth structure of a loudspeaker according to an embodiment of the present disclosure. Referring to FIG. 9, the first acoustic channel 11 and the second acoustic channel 12 are connected to the adjacent wall surfaces of the speaker body 10. Both the first acoustic channel 11 and the second acoustic channel 12 have horn-shaped structures. The first acoustic channel 11 includes two independently arranged first acoustic sub-channels 111. The second acoustic channel 12 includes two independently arranged second acoustic sub-channels 121. The cross section of the speaker body 10 is a circular structure.

Based on the above embodiments, the present disclosure also provides an electronic device 20. The electronic device 20 includes but is not limited to mobile phones, tablet computers, laptop computers, wearable devices, virtual reality devices, Bluetooth headsets, in-vehicle devices, or other fixed terminal equipment with speakers.

The electronic device 20 includes a housing, and a housing cavity is provided in the housing for housing electronic devices such as batteries, camera modules, and speakers.

The structure, features, and effects according to the present disclosure are described in detail above based on the embodiments shown in the drawings. The above are only preferred embodiments of the present disclosure. However, the above embodiment do not limit the scope of the present disclosure. Any changes or equivalent embodiments which still do not exceed the concept covered by the specification and illustrations should fall within the protection scope of the present disclosure.

What is claimed is:

1. A loudspeaker, applied to an electronic device, comprising:

a speaker body configured for vibrating and producing sound;

a first acoustic channel having a first end communicated with the speaker body and a second end forming a first sound output port on a case of the electronic device; and a second acoustic channel having a first end communicated with the speaker body and a second end forming a second sound output port on the case of the electronic device, wherein the first sound output port and the second sound output port are located on adjacent wall surfaces of the case of the electronic device, a wall surface of the speaker body connected with the first acoustic channel is oblique with respect to the wall surface of the case of the electronic device on which the first sound output port is located, a wall surface of the speaker body connected with the second acoustic channel is oblique with respect to the wall surface of the case of the electronic device on which the second sound output port is located, each of the first acoustic channel and the second acoustic channel has a horn-shaped structure, the horn-shaped structure rotates at a certain angle.

2. The loudspeaker according to claim 1, wherein an inner diameter of the first sound output port is different from an inner diameter of the second sound output port.

3. The loudspeaker according to claim 1, wherein the first acoustic channel and the second acoustic channel are connected to opposite wall surfaces of the speaker body.

4. The loudspeaker according to claim 1, wherein the first acoustic channel and the second acoustic channel are both provided with a sound absorbing material.

5. An electronic device, comprising a case and a loudspeaker installed in the case, wherein the loudspeaker comprises:

a speaker body configured for vibrating and producing sound;

a first acoustic channel having a first end communicated with the speaker body and a second end forming a first sound output port on a case of the electronic device; and a second acoustic channel having a first end communicated with the speaker body and a second end forming a second sound output port on the case of the electronic device, wherein the first sound output port and the second sound output port are located on adjacent wall surfaces of the case of the electronic device, a wall surface of the speaker body connected with the first acoustic channel is oblique with respect to the wall surface of the case of the electronic device on which the first sound output port is located, a wall surface of the speaker body connected with the second acoustic channel is oblique with respect to the wall surface of the case of the electronic device on which the second sound output port is located, each of the first acoustic channel and the second acoustic channel has a horn-shaped structure, the horn-shaped structure rotates at a certain angle.

* * * * *